Figure 1:
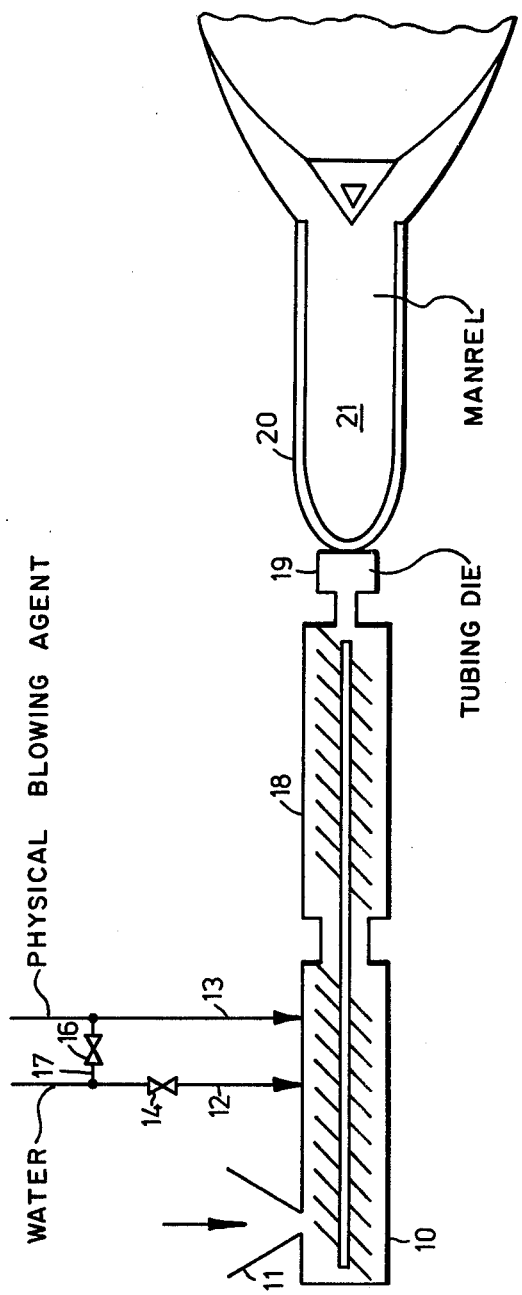

United States Patent [19]

Schubert et al.

[11] 4,455,272

[45] Jun. 19, 1984

[54] METHOD OF EXTRUDING A POLYSTYRENE FOAM USING BOTH A PHYSICAL BLOWING AGENT AND WATER

[75] Inventors: John C. Schubert; Edward C. LeDuc, both of Chippewa Falls, Wis.

[73] Assignee: Standard Oil Company (Indiana), Chicago, Ill.

[21] Appl. No.: 362,954

[22] Filed: Mar. 29, 1982

[51] Int. Cl.³ .................................... B29D 27/00
[52] U.S. Cl. ..................... 264/53; 264/DIG. 5; 264/DIG. 13; 521/146; 521/910
[58] Field of Search .............. 264/53, DIG. 5, 51, 264/41, 49, DIG. 13; 521/146, 910

[56] References Cited

U.S. PATENT DOCUMENTS

| | | | |
|---|---|---|---|
| 2,354,260 | 7/1944 | Haney et al. | 264/53 |
| 2,797,443 | 7/1957 | Carlson, Jr. | 264/53 X |
| 2,911,382 | 11/1959 | Barkhuff et al. | 264/DIG. 5 |
| 3,089,857 | 5/1963 | Pottenger | 264/DIG. 5 |
| 3,268,636 | 8/1966 | Angell, Jr. | 264/51 |
| 3,309,439 | 3/1967 | Nonweiler | 264/45.4 |
| 3,436,446 | 4/1969 | Angell, Jr. | 264/51 |
| 3,763,301 | 10/1973 | Civardi et al. | 264/41 X |
| 3,784,488 | 1/1974 | Steinhauer et al. | 264/41 X |
| 3,787,542 | 1/1974 | Gallagher et al. | 264/DIG. 5 |
| 3,824,139 | 7/1974 | Ware et al. | |
| 3,939,849 | 2/1976 | Baxter et al. | 264/53 X |
| 3,940,467 | 2/1976 | Brachman | 264/DIG. 5 |
| 4,127,547 | 11/1978 | Smarook | 264/53 X |
| 4,217,319 | 8/1980 | Komori | 264/DIG. 5 |

Primary Examiner—Philip E. Anderson
Attorney, Agent, or Firm—Robert R. Cochran; William T. McClain; William H. Magidson

[57] ABSTRACT

Forming polystyrene foam by extruding polystyrene, nucleating agent, physical blowing agent, and water where the physical blowing agent and water are injected into extruder to provide blowing system. The product produced has small cells at junction points between membranes of the foam.

9 Claims, 5 Drawing Figures

METHOD OF EXTRUDING A POLYSTYRENE FOAM USING BOTH A PHYSICAL BLOWING AGENT AND WATER

This invention relates to extruded polystyrene foam. In particular, the invention relates to an improved process for producing such foams to produce foams of lower density and a unique cell structure.

Extrusion processes for producing such foam are well known in the art and are normally based on physical blowing agents such as lower hydrocarbons and halogenated hydrocarbons. In some cases chemical blowing agents have been used.

A number of investigators have studied the effect of water in such operations. An example of this is Carlson Jr., U.S. Pat. No. 2,797,443 (1957) which discloses the standard pentane blowing system using polystyrene pellets mixed with a critical amount of water and extruding the blended materials. A difficulty with the process is accurate control of water introduced with the pellets into the extruder. The feed system, connected to the extruder, is relatively hot and this results in an uncontrolled evaporation of the water from the pellets.

Nonweiler, U.S. Pat. No. 3,309,439 (1967) recognized a difficulty of control of the amount of water and substituted for the water, hydrates containing at least 25% by weight chemically bound water. The patent also speaks of the difficulty of effective distribution of the water where it is used in the uncombined state.

Ware, et al., U.S. Pat. No. 3,824,139 (1974) disclose a process using water as a foaming agent in combination with a chemical foaming agent such as azodicarbonamide, azodiisobutyronitrile, benzenesulphonhydrazide, p,p'-oxybis-benzenesulphonhydrazide, p-toluene sulphonyl semicarbazide, dinitroso pentamethylene diamine.

An object of this invention is to provide a new polystyrene foam having a unique combination of large and small cells.

A further object of this invention is to provide a system for blowing polystyrene foam using a mixture of physical blowing agent and water, the water providing an extra amount of vapor pressure for the production of low density foams and also produces a large amount of evaporative cooling.

Other objects and advantages will be apparent to those skilled in the art upon reading this disclosure.

Broadly, our invention resides in a process for producing extruded polystyrene foam comprising feeding a mixture comprising styrene polymer and nucleating agent to an extruder, and injecting physical blowing agent into the mixture in the extruder, the improvement comprising also injecting water into the extruder and extruding the resulting foamable mixture. In another aspect, our invention resides in the novel product of the process. This foam has a novel cell structure and can be made of lower density than with the physical blowing agent alone.

For convenience, we have referred to polystrene; it should be noted that the invention is broadly applicable to the family of resins known as styrenics. These include, by way of example, polymers of alkyl and halo substituted styrene such as alpha-methylstyrene, para-isobutylstyrene, para-chlorostyrene, and the like as well as copolymers of styrene and vinyl substituted monomers such as maleic anhydride, etc. The term "styrene polymer" includes all such polymers.

Accompanying and forming a part of this disclosure is a drawing comprising:

FIG. 1 showing in schematic form, one system of producing foam according to the present invention, and FIGS. 2-5 showing microphotographs of polystrene foams.

In this system of FIG. 1, resin pellets comprising at least polystyrene and talc are fed to an extruder 10 to supply hopper 11. Other additives such as colorants, stabilizers, etc. can be added but are not essential for the invention. In extruder 10, the resin is thoroughly fused at a temperature above its melting point, generally in the range of 150° to 250° C. The blowing agent mixture is introduced in the downstream end of extruder 10 in two optional systems. For this purpose, feed injection lines 12 and 13 are provided for feeding water and physical blowing agent, respectively. Optionally, the water and physical agent can be injected at a common point, and for this purpose valve 14 in line 12 and valve 16 in line 17 are provided.

From the extruder, the resin is passed to mixer 18 for thorough mixing and temperature reduction, temperatures of 75° and 135° C. generally being used. From mixer 18 the mixture passes to a tubing die 19. For the production that is suitable for use in packaging materials, a circular die is used and the tubular film 20 expanded over a mandrel 21, cut with a knife 22, opened up and taken to a take-up system, not shown. This is a well developed system used by many manufacturers.

We believe that this invention will be applicable to all the physical blowing agnets suggested in the prior art, these including propane, normal and isobutane, all of the isomeric pentanes and hexanes and halogenated hydrocarbons exemplified by Freon 11, trichlorofluoromethane and Freon 12, dichlorodifluoromethane. The quantity of physical blowing agent can vary depending upon the product desired but generally should be in the range of 0.05 to 0.1 gram mols per 100 grams of resin. For butane, this correpsonds to about 3 to 6 weight percent based on the polystyrene resin used.

Talc is the nucleating agent of choice for our invention and we have not had successful results with the commonly used mixture of citric acid and sodium bicarbonate, the latter system not giving the desired low density and producing a coarse cell structure. However, it should be noted that the amount of talc can be low compared to the amount frequently used in such systems, the usual amount being approximately 0.5 weight percent. For good results, in the present invention the amount of talc should be in the range from 0.01 to 0.3 weight percent based on the resin. More than 0.3 weight percent produces a product with very small cell structures resulting in low compressive strength.

The amount of water used ranges from 0.5 to 5 weight percent based upon the resin.

The following examples are illustrative but should not be considered unduly limiting.

EXAMPLE I

A series of runs were made to illustrate the invention using water as a supplemental blowing agent with butane and to provide controls omitting the water or using an excessive amount of nucleating agent (talc). Used was a 4½ inch extruder operating at 150° to 215° C. and a 6 inch mixer operating at 75-95° C. Recipes and product properties are shown below, the polystyrene being a commercial product identified as Amoco R2 grade.

| Component | Run 1 | Run 2 | Run 3 | Run 4 | Run 5 |
|---|---|---|---|---|---|
| Polystyrene, g | 100 | 100 | 100 | 100 | 100 |
| Normal butane | | | | | |
| Wt. % | 4.8 | 4.0 | 5.8 | 4.0 | 4.0 |
| g/mols | 0.082 | 0.069 | 0.10 | 0.069 | 0.069 |
| Talc, wt. % | 0.2 | 0.2 | 0.5 | 0.5 | 0.5 |
| Water, wt. % | 1.8 | 1.8 | 0 | 0 | 1.8 |
| Density #/ft$^3$ | 1.85 | 2.19 | 2.80 | 3.44 | 2.12 |
| Compressive strength | good | good | good | good | low |

In each run the mixture was extruded through a circular die under a die pressure of 2100 pounds per square inch at a rate of 550 pounds per hour.

Runs 1 and 2 illustrate the invention and show the lowest density while retaining good compressive strength. Conventional recipes, Runs 3 and 4, show higher density products. Run 5 duplicates Run 2 except for using the conventional amount of talc. A product having poor compressive strength resulted. Compressive strength is a qualitative test used by those skilled in the art.

Figure 3:
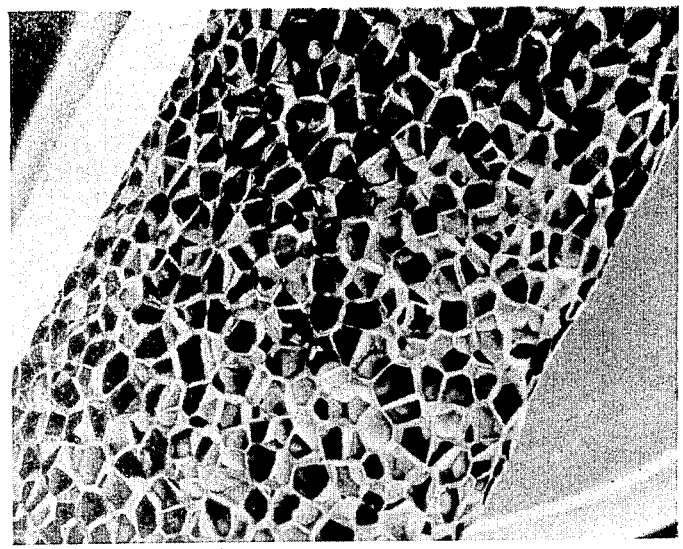
Figure 2:
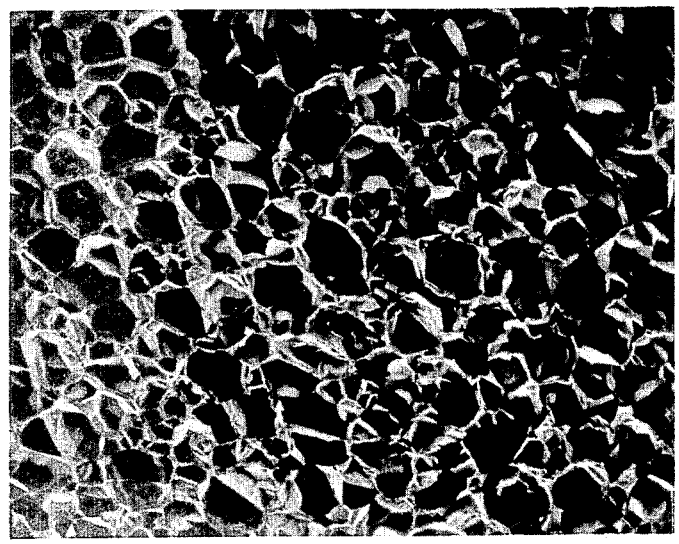
Figure 5:
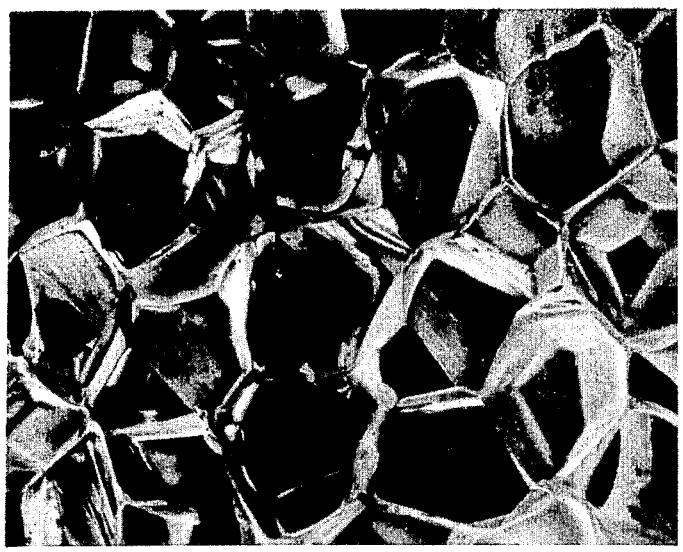
Figure 4:
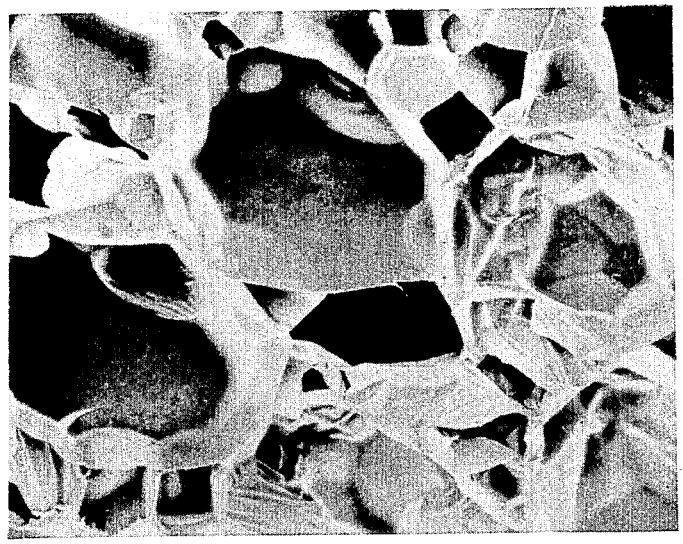

The foams of Runs 2 and 4 were examined using a scanning electron microscope. FIGS. 2 and 4 show, respectively, the foam of the present invention and FIGS. 3 and 5 show the foam made with butane according to the prior art. FIGS. 2 and 3 are taken at a magnification of 20 times and show the generally uniform structures of each of the foams over a considerable area of the foam.

FIGS. 4 and 5 show the products of Runs 2 and 4, respectively, at a magnification of 80 times and these microphotographs bring out the differences in structure. FIG. 5 shows the classic structure of polystyrene foam blown with butane with the characteristic cell structure being a mixture of round cells having a size range of 50 to 250 microns in diameter with some oblong cells ranging in size from 50 by 200 microns to 200 by 300 microns. The foam of the present invention shown in FIG. 4 shows small cells at the wall junction points between membranes. Stated another way, the interstices between membranes show very small cells. The exposed cells in the foam sheet of FIG. 4 appear round in shape and range in size from 25 to 500 microns in diameter. Also to be noted in FIG. 4 is the coherency of the membranes with the absence of splits or missing sections and very few wrinkled membranes.

EXAMPLE II

Another run was made using a similar system in which the material was extruded through a flat slot die, the extruder and mixer being the same as in Example I. The recipe was:

| Component | Run 6 |
|---|---|
| Polystyrene, g | 100 |
| Normal butane | |
| Wt. % | 4 |
| g/mols | 0.069 |
| Talc, wt. % | 0.24 |
| Water, wt. % | 2.3 |
| Density, #/ft$^3$ | 1.85 |
| Compressive strength | good |

The product was extruded at a rate of 500 pounds per hour using a die pressure of slightly under 500 pounds per square inch. The product was a billet of generally rectangular shape approximately sixteen inches wide by three inches thick which was subsequently handsawed into true rectangular shape for measurement of physical properties.

In our invention, the water provides an extra amount of vapor pressure for the production of lower density materials, and also produces evaporative cooling at a rate almost four times greater than typical blowing agents without plasticizing the melt. In Example II the relative cooling effects of the butane and water can be approximated through calculation using heats of vaporization and the heat capacity of polystyrene.

$H_V$ Water = 540 cal./gm. $H_V$ Butane = 86 cal./gm.
Heat capacity polystyrene = 0.32 cal./gm. −°C.

$$\frac{2.3 \text{ gm. H}_2\text{O}}{100 \text{ gms. P.S.}} \times \frac{540 \text{ cal.}}{\text{gm. H}_2\text{O}} \times \frac{\text{gm. P.S. −°C.}}{0.32 \text{ cal.}} = 38° \text{ C.}$$

(cooling effect of water)

$$\frac{4 \text{ gm. Butane}}{100 \text{ gms. P.S.}} \times \frac{86 \text{ cal.}}{\text{gm. Butane}} \times \frac{\text{gm. P.S. −°C.}}{0.32 \text{ cal.}} = 11° \text{ C.}$$

We believe that this cooling is made especially effective by the high diffusion rate of water through polystyrene, which enables the water to escape the structure rapidly and avoid heat release through condensation in the material. It has been demonstrated in processing that an excess of water at a given material temperature can cool the structure below the (fracture) glass point before it can be stretched on the sizing drum in the typical fashion. An equal increase in blowing agent will not cause this fracture, since the melt will become more highly plasticized and stretch despite the increase in cooling.

These examples illustrate specific examples of the invention because those skilled in the art will recognize considerable variation therefrom can be made while coming within the broad scope of the information.

We claim:

1. In a process for producing extruded polystyrene foam comprising feeding a mixture comprising styrene polymer and nucleating agent to an extruder, and injecting physical blowing agent into the mixture in the extruder, the improvement comprising also injecting water into the extruder and extruding the resulting foamable mixture.

2. The improvement of claim 1 wherein the water and physical blowing agent are supplied to the extruder at a common point.

3. The improvement of claim 1 wherein said nucleating agent is talc.

4. The improvement of claim 3 wherein said talc is used in an amount of 0.01 to 0.3 weight percent based on styrene polymer.

5. The improvement of claim 1 wherein said physical blowing agent is in the range of 0.05 to 0.1 gram mols per 100 grams of styrene polymer.

6. The improvement of claim 5 wherein said physical blowing agent is selected from the group consisting of hydrocarbons containing 3 to 6 carbon atoms, dichlorodifluoromethane and trichlorofluoromethane.

7. The improvement of claim 5 wherein said physical blowing agent is normal butane.

8. The improvement of claim 1 wherein said water is injected in the range of 0.5 to 5 weight percent based on the weight of the styrene polymer.

9. The process of claim 1 wherein the physical blowing agent is in the range of 0.05 to 0.1 gram mole per 100 grams of styrene polymer and said water is in the range of 0.5 to 5 weight weight percent based on the weight of the styrene polymer.

* * * * *